United States Patent [19]

Kobayashi et al.

[11] Patent Number: 5,687,817
[45] Date of Patent: Nov. 18, 1997

[54] DISC BRAKE

[75] Inventors: Kinzo Kobayashi; Naganori Koshimizu; Shinji Suzuki, all of Yamanashi-ken, Japan

[73] Assignees: Tokico Ltd.; Nissan Motor Co., Ltd., both of Kanagawa-Ken, Japan

[21] Appl. No.: 592,674

[22] Filed: Jan. 26, 1996

[30] Foreign Application Priority Data

Jan. 27, 1995 [JP] Japan .................... 7-031356

[51] Int. Cl.$^6$ .................................... F16D 55/22
[52] U.S. Cl. .................... 188/72.3; 188/73.38; 188/1.11
[58] Field of Search ................. 188/1.11 W, 73.35, 188/73.36, 73.37, 73.38, 72.3; 192/30 W

[56] References Cited

U.S. PATENT DOCUMENTS

| | | | |
|---|---|---|---|
| 4,245,723 | 1/1981 | Moriya | 188/72.3 |
| 5,033,590 | 7/1991 | Kobayashi et al. | 188/1.11 W |
| 5,048,645 | 9/1991 | Thiel et al. | 188/73.38 X |
| 5,069,313 | 12/1991 | Kato et al. | 188/72.3 |
| 5,538,103 | 7/1996 | Rueckert et al. | 188/73.38 X |

*Primary Examiner*—Douglas C. Butler
*Assistant Examiner*—Pamela J. Lipka
*Attorney, Agent, or Firm*—Wendroth, Lind & Ponack

[57] ABSTRACT

Wear warning elements are respectively provided in back plates of a pair of friction pads at the front side thereof with respect to a rotational direction of a disc rotor. A pad spring is disposed between the friction pads and a carrier. The pad spring includes a pair of spring portions. The spring portions are resiliently pressed against the wear warning elements to bias the friction pads away from the disc rotor, respectively. During a braking state, the friction pads are pressed against the disc rotor against the biasing force of the spring portions. When disengaging the friction pads from the disc rotor, the friction pads are moved by the biasing force of the spring portions of the pad spring, thereby enabling the friction pads to be reliably moved away from the disc rotor and preventing drag between the friction pads and the disc rotor.

9 Claims, 9 Drawing Sheets

DISC BRAKE

BACKGROUND OF THE INVENTION

1. Field of the Invention

The present invention relates to a brake apparatus in general, and more particularly to a disc brake for a vehicle such as an automobile.

2. Description of the Related Art

In general, a disc brake mounted on a vehicle such as an automobile include a pair of brake friction pads and a hydraulic oil cylinder for actuating the friction pads. The friction pads are disposed at opposite sides of a disc rotor which rotates together with the wheels of the vehicle, and are guided by a carrier fixedly mounted on the body of the vehicle to move toward the disc rotor and away therefrom. Supply of a hydraulic medium under pressure from a master cylinder enables the hydraulic cylinder to be actuated and the friction pads to be pressed against the disc rotor to generate a braking force.

In this case, it is necessary for the friction pads to move away from the disc rotor by a suitable distance after relieving the hydraulic pressure in the hydraulic cylinder. If the distance between the friction pads and the disc rotor is not sufficient, so-called "drag" is generated, which results in rapid wear of the friction pads, and increases running resistance thereby increasing fuel consumption.

In order to solve the above drawbacks, there is provided a disc brake as disclosed in Japanese Utility Model Public Disclosure [Kokai] No. 56-21633. The disc brake comprises a disc rotor, first and second brake friction pads disposed at opposite sides of the disc rotor, and generally V-shaped first and second wires mounted on the friction pads for biasing the friction pads away from each other. The first friction pad includes a first back plate, and the second friction pad includes a second back plate. The first and second back plates each includes at its outer circumferential end face two engagement holes. The first and second wires extend over the disc rotor. The opposite ends of the first wire extend into and engage with one engagement hole of the first back plate and one engagement hole of the second back late, respectively. The opposite ends of the second wire extend into and engage with the other engagement hole of the first back plate and the other engagement hole of the second back plate, respectively. This allows the friction pads to be connected to each other through the wires to bias the friction pads away from each other.

As disclosed in Japanese Utility Model Public Disclosure [Kokai] No. 57-61237, there is provided a disc brake comprising a disc rotor, a pair of brake friction pads disposed at opposite sides of the disc rotor, a carrier for supporting the friction pads, and a pad spring arranged between the friction pads and the carrier. The pad spring includes a pair of flat plate-shaped leaf spring arms for respectively bearing against the friction pads to bias the friction pads away from each other.

However, the above mentioned typical disc brakes have the following drawbacks.

In the disc brake having the generally V-shaped wires, since the opposite ends of the first wire are respectively attached to the outer circumferential ends of the back plates and the opposite ends of the other wire are respectively attached to the outer circumferential other ends of the back plates, the biasing force of the V-shaped wires are applied to portions of the friction pads which are away from portions of the carriers for guiding the friction pads. This allows the friction pads to be easily obliquely displaced so that the distance between the friction pads and the disc rotor is not sufficient.

In addition to the above, in a case where sliding friction generated by movement of one friction pad to and away from the disc rotor are different from that generated by movement of the other friction pad, application of the biasing forces by the generally V-shaped wires to the friction pads for biasing the friction pads away from each other does not enable the friction pads to be moved by an even distance away from the disc rotor, which does not sufficiently prevent generation of drag. There is provided a caliper floating type of disc brake for applying a braking force to a disc rotor comprising a caliper including a pawl portion, a pair of friction pads, and a hydraulic cylinder including a piston. By actuation of the piston, one friction pad is pressed against the disc rotor. In reaction to the pressing action of one friction pad, the other friction pad is pressed against the disc rotor through the pawl portion of the caliper. In particular, in such a caliper floating type of disc brake, since sliding frictions of the friction pads are different from each other, it is difficult for the friction pads to be moved by an even distance away from the disc rotor by using the generally V-shaped wires.

Additionally, the provision of the generally V-shaped wires increases the number of elements and machining steps for providing the engagement holes at the back plates of the friction pads.

In the disc brake including the pad spring having the leaf spring arms, as shown in FIG. 21, the pad spring 3 is disposed between the back plate 1 of the friction pad and the carrier 2. The leaf spring arm 4 is provided on the pad spring 3, and is flat. As the associated friction pad is worn away, the back plate 1 is moved toward the disc rotor (not shown) side. In other words, the back plate 1 is moved from the position (shown by the solid line) of the back plate 1 in a case where the friction pad is new to the position (shown by the phantom line) thereof in a case where the friction pad i worn away. When the back plate 1 is moved to the position shown by the phantom line, the position on the leaf spring arm 4 against which the back plate 1 abuts is moved toward the distal end of the leaf spring arm 4. This causes a biasing force $F_o$ of the leaf spring arm 4 and a component $F_r$ of the biasing force $F_o$ acting in a direction to move the friction pad away from the disc rotor to be decreased, and thereby makes it difficult to stably prevent drag from being generated.

SUMMARY OF THE INVENTION.

In view of the drawbacks of the above related arts, it is an object of the present invention to provide a disc brake which can reliably prevent drag from being generated.

To this end, the present invention provides a disc brake for applying a braking force to a disc rotor including a pair of brake surfaces comprising: a pair of friction pads disposed at opposite sides of the disc rotor for being pressed against the brake surfaces of the disc rotor, respectively during a braking state, the friction pads including back plates having end portions facing each other, respectively; a carrier for guiding the end portions of the back plates; and means for biasing the friction pads in the vicinity of the end portions of the back plates away from the disc rotor and providing a biasing force regardless of the position of the friction pads.

The present invention also provides a disc brake for applying a braking force to a disc rotor including a pair of brake surfaces comprising: a pair of friction pads disposed at opposite sides of the disc rotor for being pressed against the brake surfaces of the disc rotor, respectively during a braking state, the friction pads including back plates having first end portions facing each other, a carrier for guiding the first end portions of the back plates; a first pad spring provided between the first end portions of the back plates and the carrier; a pair of wear warning elements mounted on the first end portions of the back plates to face the brake surfaces of the disc rotor, respectively; and a pair of spring elements provided at the first pad spring for contacting with the wear warning elements, respectively to bias the friction pads away from the disc rotor.

According to an embodiment of the present invention, the spring elements may be integrally formed with the first pad spring.

The present invention also provides a disc brake for applying a braking force to a disc rotor including a pair of brake surfaces comprising: a pair of friction pads disposed at opposite sides of the disc rotor for being pressed against the brake surfaces of the disc rotor, respectively during a braking state, the friction pads including back plates having first end portions facing each other and second end portions facing each other, respectively; a carrier for guiding the first end portions of the back plates; a first pad spring provided between the first end portions of the back plates and the carrier; a second pad spring provided between the second end portions of the back plates and the carrier; and the first pad spring including a pair of spring portions, the spring portions each having a lead portion which is bent to extend toward the back plate to bear against the associated back plate to bias the associated friction pad away from the disc rotor.

The present invention also provides a disc brake for applying a braking force to a disc rotor including a pair of brake surfaces comprising: a pair of friction pads disposed at opposite sides of the disc rotor for being pressed against the brake surfaces of the disc rotor, respectively during a braking state, the friction pads including back plates; a carrier for supporting the back plates of the friction pads; a pair of auxiliary springs respectively mounted on the back plates; and a pair of spring elements mounted on the carrier for respectively bearing against the auxiliary springs to bias the friction pads away from the disc rotor by cooperation of the spring elements and the auxiliary springs.

The present invention also provides a disc brake for applying a braking force to a disc rotor including a pair of brake surfaces comprising: a pair of friction pads disposed at opposite sides of the disc rotor for being pressed against the brake surfaces of the disc rotor, respectively during a braking state, the friction pads including back plates having first end portions facing each other and second end portions facing each other, respectively; a carrier for guiding the first end portions of the back plates and the second end portions of the back plates; a first pad spring provided between the first end portions of the back plates and the carrier; a second pad spring provided between the second end portions of the back plates and the carrier; the first pad spring including a pair of spring portions, the spring portions each having a bent portion extending from the outside of the associated back plate toward the inside of the back plate for bearing against the first end portion of the back plate to bias the associated friction pad away from the disc rotor; and the second pad spring including a pair of spring portions, the spring portions each having a bent portion extending from the outside of the associated back plate toward the inside of the back plate for bearing against the second end portion of the back plate to bias the associated friction pad away from the disc rotor.

The present invention also provides a disc brake for applying a braking force to a disc rotor including a pair of brake surfaces comprising: a pair of friction pads disposed at opposite sides of the disc rotor for being pressed against the brake surfaces of the disc rotor, respectively during a braking state, the friction pads including back plates having end portions facing each other, respectively; a carrier for guiding the end portions of the back plates; and means for biasing the friction pads in the end portions of the back plates away from the disc rotor and providing a constant biasing force regardless of the position of the friction pads during a braking state.

The present invention further provides a disc brake for applying a braking force to a disc rotor including a pair of brake surfaces comprising: a pair of friction pads disposed at opposite sides of the disc rotor for being pressed against the brake surfaces of the disc rotor, respectively during a braking state, the friction pads including back plates having end portions facing each other, respectively; a carrier for guiding the end portions of the back plates; and means for biasing the friction pads away from the disc rotor and providing a constant biasing force regardless of the position of the friction pads during a braking state.

The present invention still further provides a disc brake for applying a braking force to a disc rotor including a pair of brake surfaces comprising: a pair of friction pads disposed at opposite sides of the disc rotor for being pressed against the brake surfaces of the disc rotor, respectively during a braking state, the friction pads including back plates having end portions facing each other, respectively; a carrier for guiding the end portions of the back plates; and means for biasing the friction pads away from the disc rotor and providing a constant biasing force regardless of wear condition of the friction pads.

According to the present invention, the biasing force of the biasing means acts on the friction pads in the vicinity of the end portions of the back plates to move the friction pads away from the disc rotor, and constant biasing force is applied to each of the friction pads regardless of the position of the friction pads during a braking state.

According to the present invention, the biasing force of the spring elements fixedly mounted on the carrier acts on the back plates through the wear warning elements, respectively to move the friction pads away from the disc rotor during non-braking.

According to the present invention, the biasing force of the spring portions of the first pad spring fixedly mounted on the carrier acts on the back plates, respectively to move the friction pads away from the disc rotor during non-braking. The spring portions have lead portions which are respectively bent to extend toward the back plates to bear against the back plates. Thus, even if the contact positions between the back plates and the lead portions are moved toward the distal ends of the lead portions due to wear of the friction pads, the lead portions of the spring portions bend considerably, thereby enabling the biasing force of the spring portions acting on the back plates to be substantially kept at a constant in spite of the degree of wear of the friction pads.

According to the present invention, the biasing force of the spring elements fixedly mounted on the carrier acts on the back plates through the auxiliary springs, respectively to move the friction pads away from the disc rotor during a non-braking state. Thus, even if the contact positions between the spring elements and the auxiliary springs are changed by wear of the friction pads, cooperation of the spring elements and the auxiliary springs enables the biasing force of the spring elements and the auxiliary springs acting on the back plates to be substantially kept at a constant in spite of the degree of wear of the friction pads.

Other features and advantages of the invention will become apparent to those skilled in the art from the following detailed description, claims, and drawings.

DESCRIPTION OF THE PREFERRED EMBODIMENTS

Embodiments of the present invention will be described below in detail with reference to the accompanying drawings.

Figure 1:
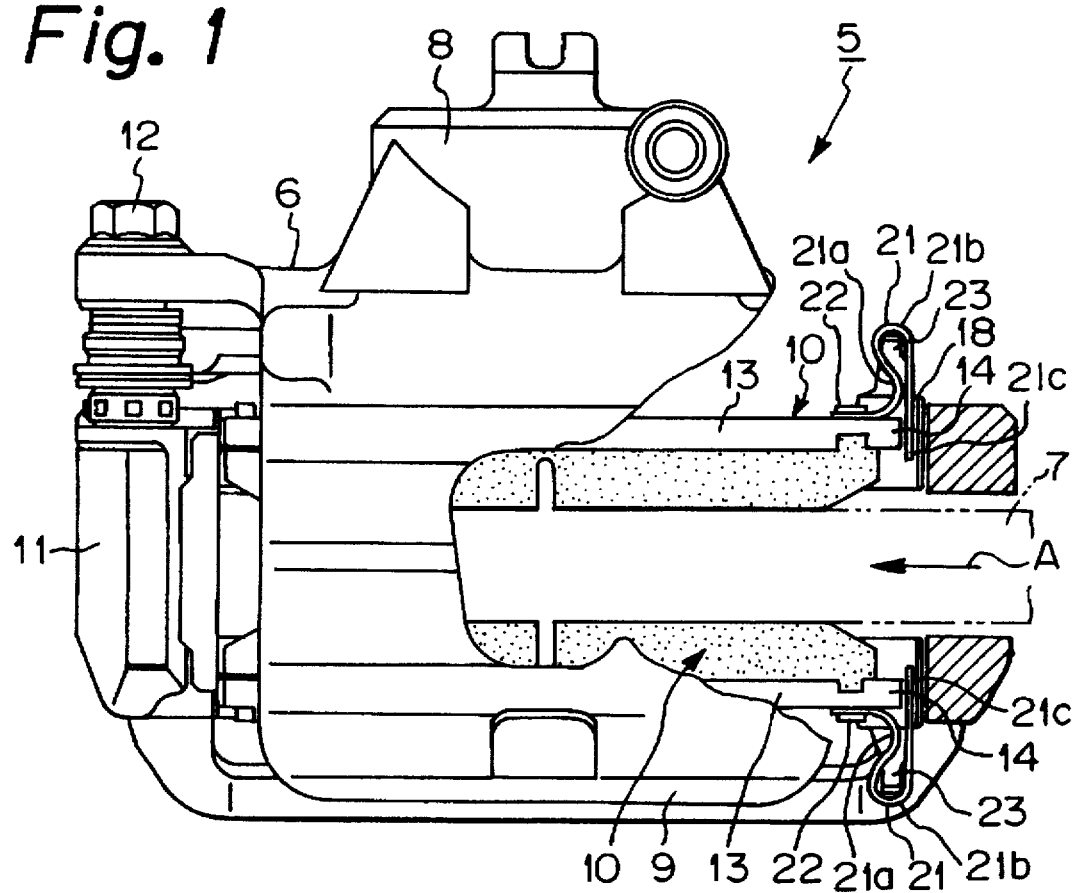
FIG. 1 is a plan view of a first embodiment of a disc brake according to the present invention.
Figure 2:
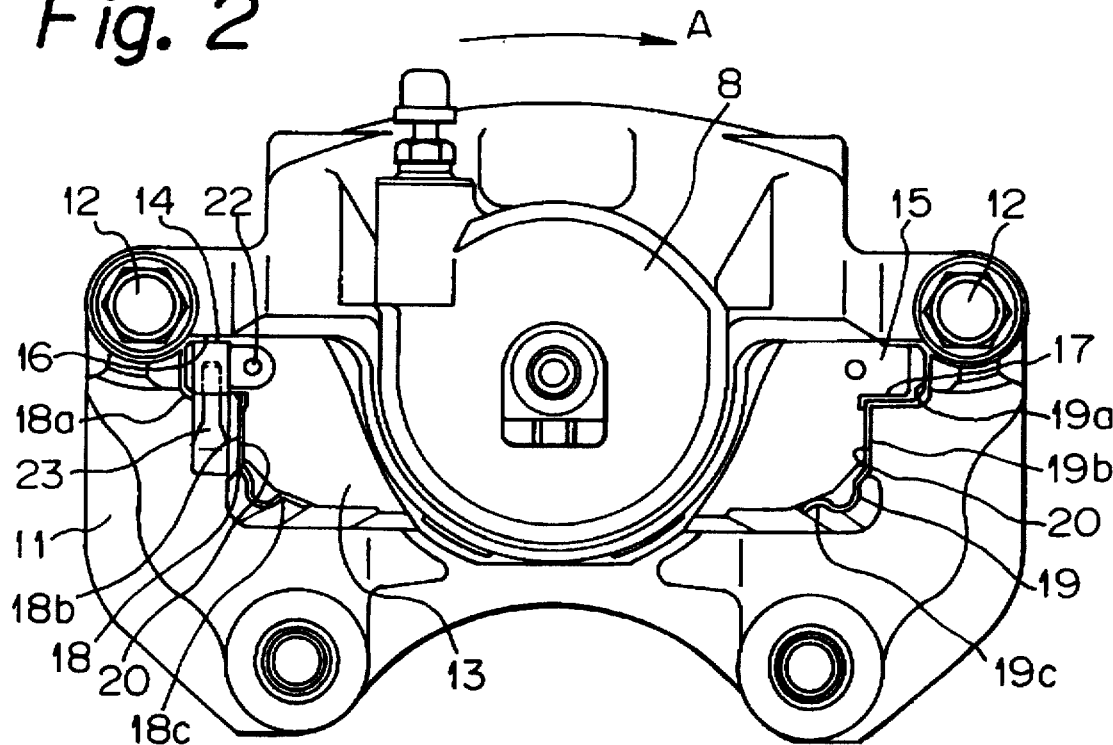
FIG. 2 is a front view of the disc brake shown in FIG. 1.
Figure 3:
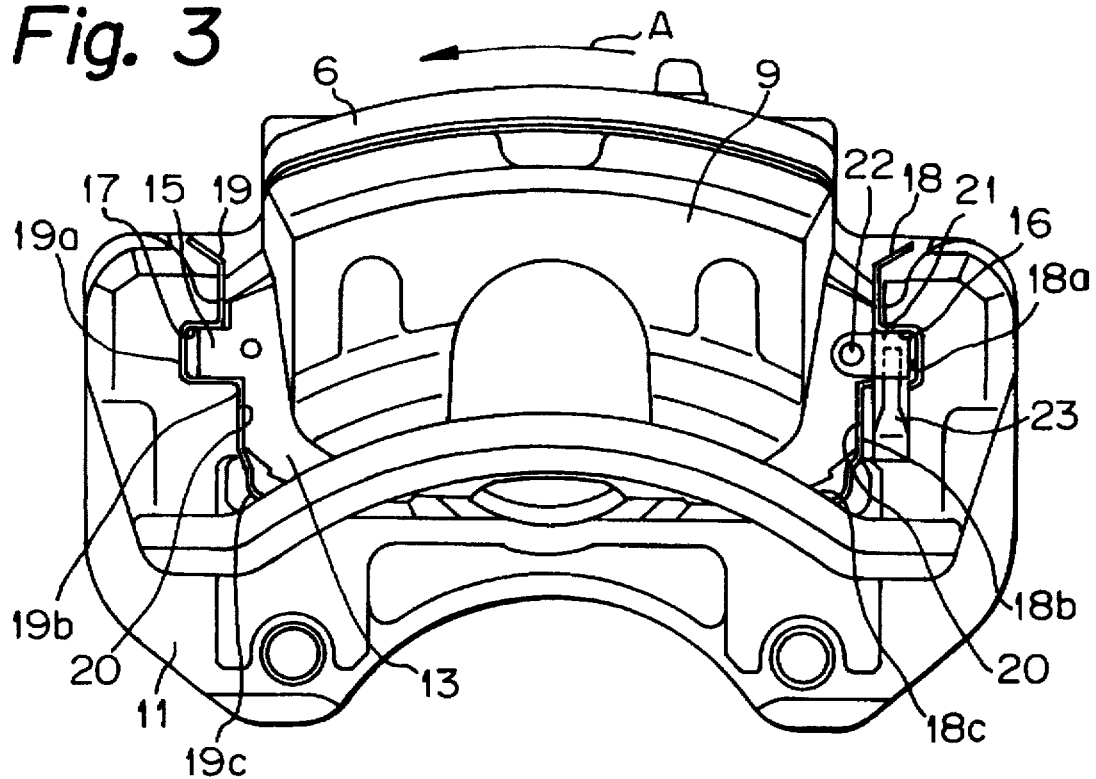
FIG. 3 is a rear view of the disc brake shown in FIG. 1.

A first embodiment of a disc brake according to the present invention will be described with reference to FIGS. 1–4. As shown in FIGS. 1–3, the disc brake 5 is a caliper floating type of disc brake. The disc brake includes a caliper body 6 having a hydraulic cylinder 8. The hydraulic cylinder 8 includes a cylinder bore and a piston, and is provided in the caliper body 6 to face one surface of a disc rotor 7 which rotates together with a wheel (not shown). The caliper body 6 includes an upper side portion or disc path portion extending over the disc rotor 7. The caliper body 6 also includes at the other surface side of the disc rotor 7 thereof a pawl portion 9 facing the hydraulic cylinder 8 through the disc rotor 7. A pair of brake friction pads 10 are provided on both sides of the disc rotor 7. In other words, one friction pad 10 is provided between the disc rotor 7 and the hydraulic cylinder 8, and the other friction pad 10 is provided between the disc rotor 7 and the pawl portion 9.

The caliper body 6 is supported by a carrier 11 fixedly mounted on a vehicle body (not shown). The carrier 11 includes a pair of guide pins 12 for slidably supporting and directing the caliper body 6 along the axial direction of the disc rotor 7. The friction pads 10 each comprises a lining element and a back plate 13. One back plate 13 includes a convex portion 14 at the front end portion thereof with respect to the rotational direction of the disc rotor 7 and a convex portion 15 at the rear end portion thereof with respect to the rotational direction of the disc rotor 7. The other back plate 13 include a convex portion 14 at the front end portion thereof with respect to the rotational direction of the disc rotor 7 and a convex portion 15 at the rear end portion thereof with respect to the rotational direction of the disc rotor 7. An arrow "A" shown in the drawings designates the rotational direction of the disc rotor 7. The convex portions 14 face each other and the convex portions 15 face each other. The carrier 11 includes a pair of grooves 16 and 16 at the front end portion thereof with respect to the rotational direction of the disc rotor 7, and a pair of grooves 17 at the rear end portion thereof. The convex portions 14 are respectively received in grooves 16 of the carrier 11 through a pad spring 18 (explained below) to be guided along the axial direction of the disc rotor 7. The convex portions 15 and 15 are respectively received in grooves 17 and 17 of the carrier 11 through a pad spring 19 (explained below) to be guided along the axial direction of the disc rotor 7.

Supply of a hydraulic fluid under pressure from a master cylinder (not shown) enables the hydraulic cylinder 8 to be actuated and one friction pad 10 to be directly pressed against the disc rotor 7. Reaction to the pressing action of the friction pad 10 causes the caliper body 6 to be moved so that the other friction pad 10 is pressed against the disc rotor 7 through the claw portion 9 to generate a braking force. The carrier 11 includes two pairs of torque bearing surfaces. The first pair of torque bearing surfaces 20 are provided in the front inner side end of the carrier 11 with respect to the rotational direction of the disc rotor 7. The second pair of torque bearing surfaces 20 are provided in the rear inner side end of carrier 11 with respect to the rotational direction thereof. During the generation of the braking force, the rotation force from the disc rotor 7 acts on the friction pads 10. The first pair of torque bearing surfaces 20 support the front side ends of the friction pads 10 through the pad spring 18, respectively when the disc rotor 7 rotates in the opposite direction of the arrow "A". The second pair of the torque bearing surfaces 20 support the rear side ends of the friction pads 10 through the pad spring 19, respectively when the disc rotor 7 rotates in the direction of the arrow "A".

Wear warning elements 21 are respectively attached to the back plates 13 of the friction pads 10 at the front side end portions of the back plates 13 with respect to the rotational direction of the disc rotor 7 so that the wear warning elements face opposite braking surfaces of the disc rotor 7, respectively. The wear warning elements 21 serve to detect a condition in which the lining elements are worn to less than a predetermined thickness. The wear warning elements 21 each comprises a plate material bent to be shaped in a "U" form, and further each comprises a first bent portion 21a, a second bent portion 21b, and a contact portion 21c. The first bent portions 21a include proximal ends fixedly mounted on the rear sides of the back plates 13 respectively. The contact portions 21c extend over the inner edges of the convex portions 14 toward the braking surfaces of the disc rotor 7 to predetermined positions, respectively. The back plates 13 include, at the rear sides thereof, engagement studs 22 projecting outwardly, respectively. The wear warning elements 21 are fixedly mounted on the back plates 13 by extending the engagement studs 22 through the proximal ends of the first bent portions 21a and clinching the head ends of the engagement studs 22, respectively. When the lining elements of the friction pads 10 are worn away to be less than a predetermined thickness, the distal ends of the wear warning elements 21 respectively come into contact with the braking surfaces of the disc rotor 7 so as dragged thereon during a braking state. This causes the contact portions 21c of the wear warning elements 21 to vibrate, thus causing drag noise, and thereby warning a driver of the wear of the friction pads 21 and of the time to replace the worn friction pads with new pads.

The pad spring 18 comprises an upper portion extending over the disc rotor 7 and a pair of leg portions respectively extending downwardly from the opposite ends of the upper portion. The leg portions each includes a guiding portion 18a for directing the convex portion 14 of the associated friction pad 10, a torque bearing portion 18b for undergoing braking torque from the associated back plate, and a retainer portion 18c having elasticity for bearing against the end portion of the associated back plate 13 at the inside of the disc rotor 7 (or the lower side portion of the associated back plate 13) to prevent the associated friction pad 10 from vibrating during a braking or engine working state. The pad spring 18 is fixedly mounted on the carrier 11, and is arranged between the front ends of the friction pads 10 and the carrier 11. The pad spring 19 comprises an upper portion extending over the disc rotor 7 and a pair of leg portions respectively extending downwardly from the opposite ends of the upper portion. The leg portions each includes a guiding portion 19a for directing the convex portion 15 of the associated friction pad 10, a torque bearing portion 19b for undergoing braking torque from the associated back plate, and a retainer portion 19c having elasticity for bearing against the end portion of the associated back plate 13 at the inside of the disc rotor 7 (or the lower side portion of the associated back plate 13) to prevent the associated friction pad 10 from vibrating during a braking or engine working state. The pad spring 19 is fixedly mounted on the carrier 11, and is arranged between the rear ends of the friction pads 10 and 10 and the carrier 11.

Figure 4:
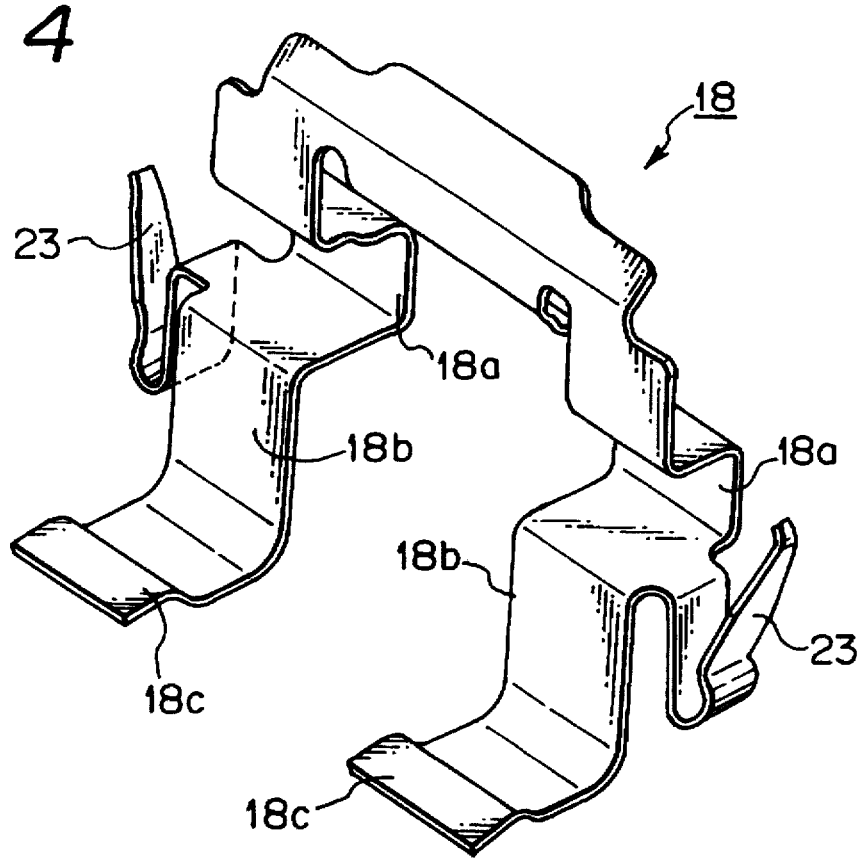
FIG. 4 is a perspective view of a pad spring shown in FIG. 1.

As shown in FIG. 4, the pad spring 18 mounted on the front side end portion of the carrier 11 with respect to the rotational direction of the disc rotor 7 includes a pair of spring elements or spring portions 23 extending from the guiding portions 18a and 18a, respectively. Each of the spring portions 23 includes a proximal end portion which is bent up to be shaped like a letter "U" and a distal end portion upwardly extending from the proximal end through an inner space defined by the second bent portion 21b of the associated wear warning element 21. The distal end portions of the spring portions 23 are resiliently pressed against the second bent portions 21b and 21b of the wear warning elements 21 with a predetermined set load (or a load to be adjusted to a predetermined value) to bias the friction pads 10 away from the disc rotor 7 through the wear warning elements 21, respectively. It should be noted that it is not necessary for the spring portions 23 of the pad spring 18 to bias the wear warning elements 21 in a case where the friction pads 10 are spaced from the disc rotor 7 sufficiently, and that biasing force to be applied to the wear warning elements by the spring portions is sufficient to move the friction pads 10 from the braking position in which the friction pads 10 are pressed against the disc rotor 7 during braking to a release position away from the disc rotor 7 by a predetermined distance during a non-braking state.

Next, the operation of the disc brake of the first embodiment, constructed as mentioned above, will be explained.

During braking, actuation of the hydraulic cylinder 8 causes the friction pads 10 to be moved against the biasing force of the spring portions 23 and 23 of the pad spring 18 and to be pressed against the disc rotor 7 to generate a braking force.

Figure 5:
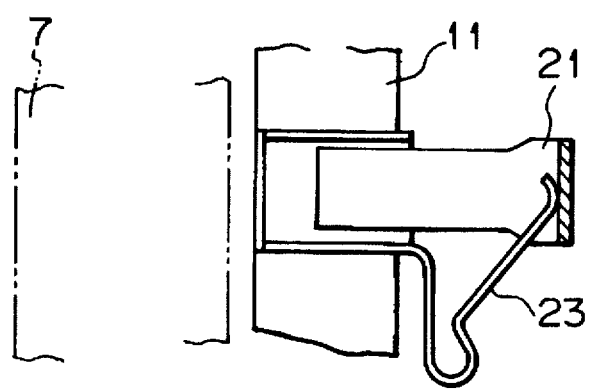
FIG. 5 is a view of the wear warning element and a spring portion, in rearward positions, in a condition where the friction pads shown in FIG. 1 are new.
Figure 6:
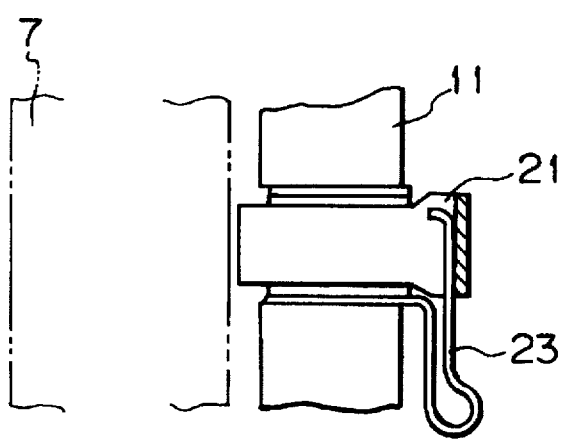
FIG. 6 is a view of the wear warning element and the spring portion, in rearward positions, in a condition where the friction pads shown in FIG. 1 are worn to a degree of limit of use.

When releasing the brakes, the piston of the hydraulic cylinder 8 is moved rearward, and the friction pads 10 are removed from engagement with the disc rotor 7. Then pressing of the spring portions 23 against the wear warning elements 21 by the biasing force thereof causes the friction pads 10 to be moved rearward so as to be suitably spaced from the disc rotor 7. FIG. 5 shows one of the spring portions 23 in a rearward position under a condition that the friction pads 10 are new. FIG. 6 shows one of the wear warning elements 23 and one of the spring portions 23 in a rearward position under a condition that the friction pads 10 are worn to a degree of limit of use.

The spring portions 23 are provided in the pad spring 18 secured to the carrier 11, and cause movement of the friction pads 10, respectively, thereby enabling the friction pads 10 to be reliably moved away from the disc rotor 7.

The wear warning elements 21 are mounted on the back plates of the frictions pads 10 closely to the convex portions 14 as guiding portions for the frictions pads 10, respectively. The spring portions 23 are pressed against the wear warning elements 21 to move the frictions pads 10, respectively. Thus, this enables the frictions pads 10 to be smoothly moved rearward without being inclined and to be reliably moved away from the disc rotor 7.

The spring portions 23 are integrally formed with the pad spring 18, and bias the friction pads 10 through the wear warning elements 21, respectively. Thus, according to the above first embodiment, the number of parts and man-hours for assembly and machining can be reduced as compared with typical disc brakes having generally V-shaped wires as separate parts.

Figure 7:
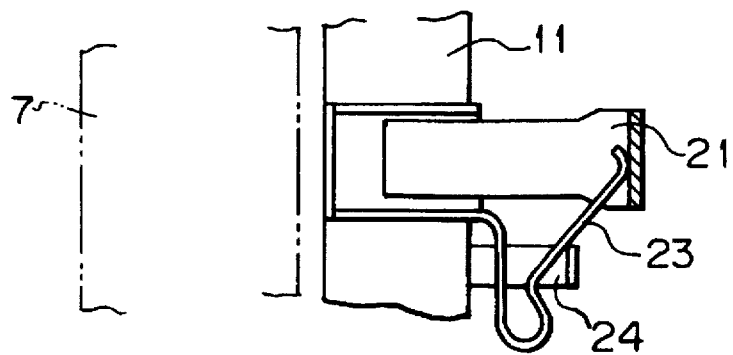
FIG. 7 is a view showing the main portion of the modification of the first embodiment and illustrating the wear warning element and the spring portion, in rearward positions, in a condition where the friction pads are new.
Figure 8:
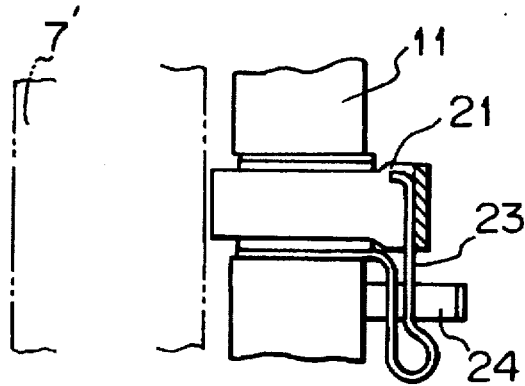
FIG. 8 is a view of the wear warning element and the spring portion shown in FIG. 7, in rearward positions, in a condition where the friction pads are worn to a degree of limit of use.

A modification of the first embodiment is shown in FIGS. 7 and 8. As shown in the drawings, the pad spring 18 includes stoppers 24 for respectively limiting the rearward positions of the spring portions 23. The carrier 11 may include such stoppers. In FIGS. 7 and 8, only one of the stoppers 24 is shown. The limitation of the rearward positions of the spring portions 23 by the stoppers 24 can prevent the friction pads 10 from being disengaged from the carrier 11 when assembling the caliper 6 into the disc brake, thereby facilitating assembly of the disc brake. FIG. 7 shows the wear warning element 21 and the spring portion 23 in their rearward positions under a condition where the friction pads 10 are new. FIG. 8 shows the wear warning element 21 and the spring portion 23 in their rearward positions under a condition that the friction
N are worn to a degree of limit of use.

Next, a second embodiment of the disc brake according to the present invention will be explained with reference to FIGS. 9 to 11. The second embodiment is different from the first embodiment in means for moving the friction pads rearward. Since the first and second embodiments are the same in construction other than the moving means, corresponding elements are denoted by the same reference numerals. Thus, in the second embodiment, explanation with respect to corresponding elements is omitted, and the different construction is described below.

Figure 9:
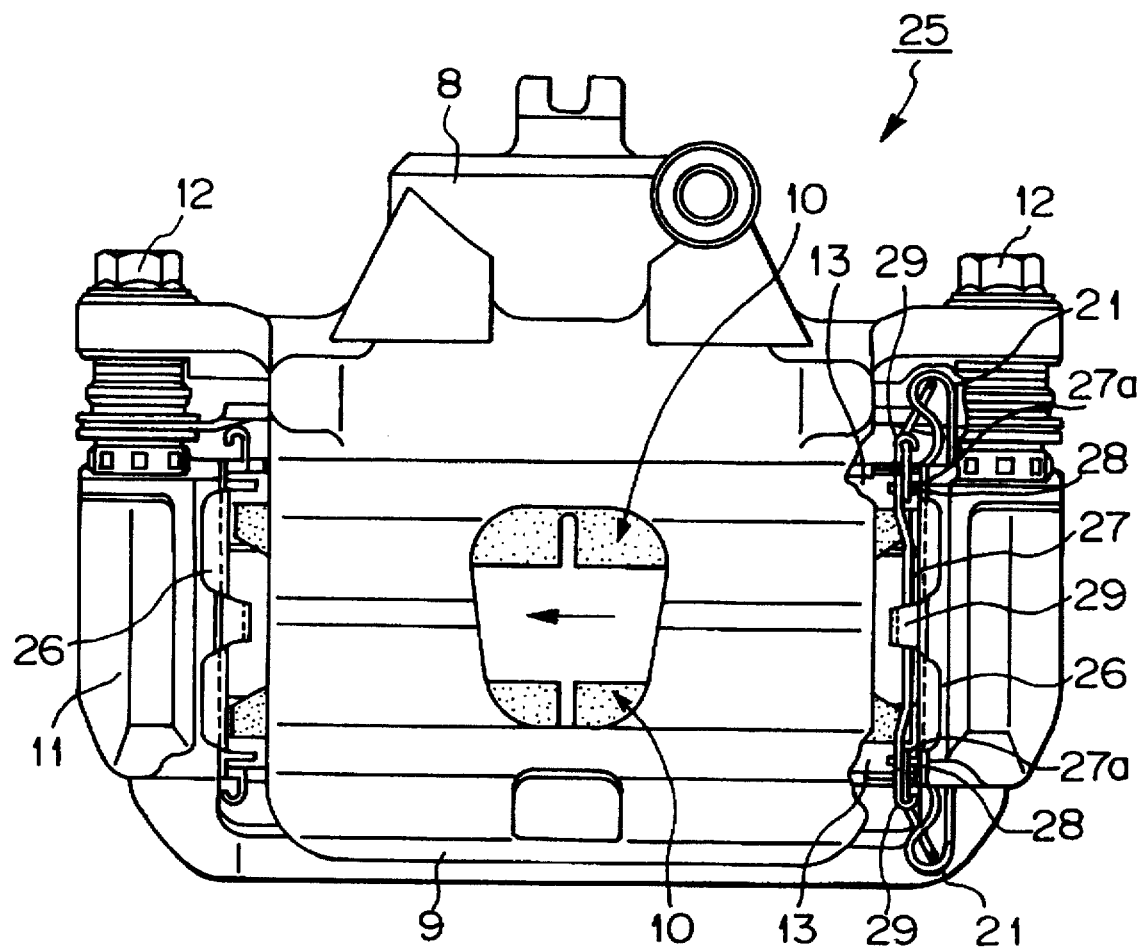
FIG. 9 is a plan view of a second embodiment of a disc brake according to the present invention.
Figure 10:
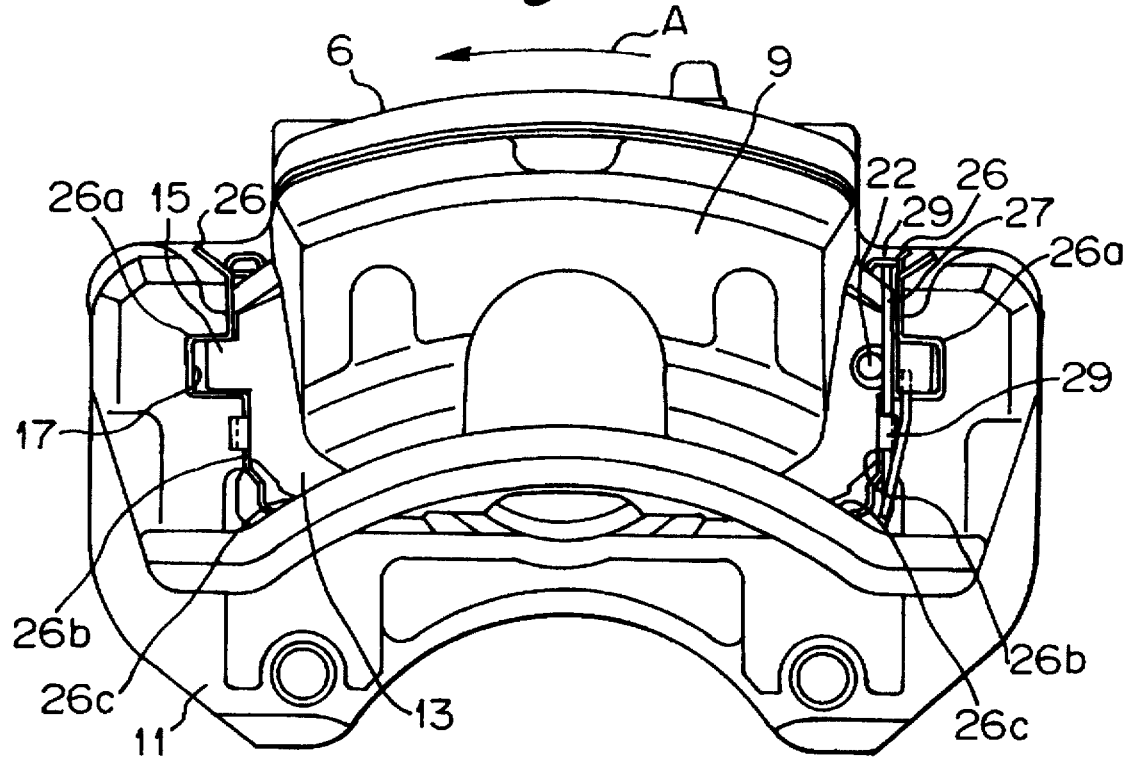
FIG. 10 is a rear view of the disc brake shown in FIG. 9.
Figure 11:
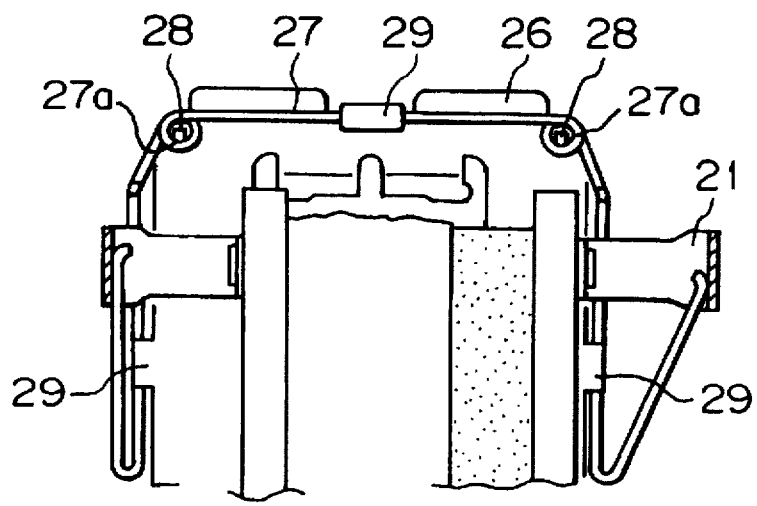
FIG. 11 is a view showing the construction of friction pads, a wear warning element, and a spring element as main elements of the disc brake shown in FIG. 9.

As shown in FIGS. 9 to 11, the disc brake 25 of the second embodiment includes a pad spring 26 at the front side of the disc brake with respect to the rotational direction of the disc rotor 7 and an opposite pad spring 26 at the rear side thereof. A spring element 27 is attached to the pad spring 26 at the front side thereof. The spring element 27 comprises a generally U-shaped wire to be positioned over the outside circumference of the disc rotor 7. The spring element 27 includes at opposite ends of its center portion loop portions 27a. Projecting portions 28 protrude from the pad spring 26. The projecting portions 28 extend through the loop portions 27a, respectively, which enables the spring element 27 to be positioned relative to the pad spring 26. The spring element 27 is also fixedly attached to the pad spring 26 by a pair of holding portions 29 provided in the lateral sides of the pad spring 26.

The spring element 27 includes opposite end portions bent to be shaped in a "V" form. The end portions of the spring element 27 respectively include distal ends extending into the inside of the wear warning elements 21 which are respectively attached to the friction pads 10. The distal ends of the spring element 27 resiliently bear against the wear warning elements 21 with a predetermined set load to bias the friction pads 10 away from the disc rotor 7, respectively. It should be noted that it is not necessary for the spring element 27 to bias the wear warning elements 21 in a case where the friction pads 10 are spaced from the disc rotor 7 sufficiently, and that biasing force applied to the wear warning elements by the spring element is sufficient to move the friction pads 10 from the braking position in which the friction pads 10 are pressed against the disc rotor 7 during a braking state to a release position away from the disc rotor 7 by a predetermined distance during a non-braking state. FIG. 11 shows at its right side the wear warning element 21 moved to its rearward position by biasing of the spring element 27 under a condition that the friction pad 10 are new. FIG. 11 also shows at its left side the wear warning element 21 moved to its rearward position by biasing of the spring element 27 under a condition that the friction pad 10 is worn to a degree of limit of use.

The pad springs 26 each comprises an upper portion extending over the disc rotor 7 and a pair of leg portions respectively extending downwardly from the opposite ends of the upper portion. The leg portions each includes a guiding portion 26a, a torque bearing portion 26b, and a retainer portion 26c. The pad springs 26 are fixedly mounted on the carrier 11. One pad spring 26 is positioned between the friction pads 10 and the carrier 11 at the front end portions of the friction pads 10 with respect to the rotational direction of the disc rotor 7. The other pad spring 26 is positioned between the friction pads 10 and the carrier 11 at the rear end portions of the friction pads 10 with respect to the rotational direction thereof. The construction is generally the same as that of the first embodiment.

In the above construction, as in the case of the first embodiment, when releasing the brakes, the piston of the hydraulic cylinder 8 is moved rearward, and the friction pads 10 are removed from engagement with the disc rotor 7. Then, pressing of the spring element 27 against the wear warning elements 21 by the biasing force in itself causes the friction pads 10 to be moved rearward to be suitably spaced from the disc rotor 7. The spring element 27 is secured to the pad spring 26 fixedly mounted on the carrier 11. The opposite end portions of the spring element 27 move the respective friction pads 10 by biasing force thereof. Thus, this enables the friction pads 10 to be reliably moved away from the disc rotor 7.

The wear warning elements 21 are mounted on the back plates of the frictions pads 10 closely to the convex portions 14 as guiding portions for the frictions pads 10, respectively. The spring element 27 is pressed against the wear warning elements 21 to move the frictions pads 10, respectively. Thus, this enables the frictions pads 10 to be smoothly moved rearward without being inclined and to be reliably moved away from the disc rotor 7.

In the first and second embodiments, the means for moving the friction pads 10 rearward (or the spring portions 23 and the spring element 27) is provided only at the front side of the disc rotor 7 with respect to the rotational direction of thereof. This enables the friction pads 10 to be reliably moved away from the disc rotor 7 to prevent drag. It should be noted that the means for moving the friction pads 10 rearward may be provided at the front and rear sides of the disc rotor 7.

Next, a third embodiment of the disc brake according to the present invention will be explained with reference to FIGS. 12 to 20. The third embodiment is different from the first embodiment in means for moving the friction pads rearward. Since the first and third embodiments are the same in construction other than the moving means, corresponding elements are denoted by the same reference numerals. Thus, in the third embodiment, explanation with respect to corresponding elements is omitted, and the different construction is described below.

Figure 12:
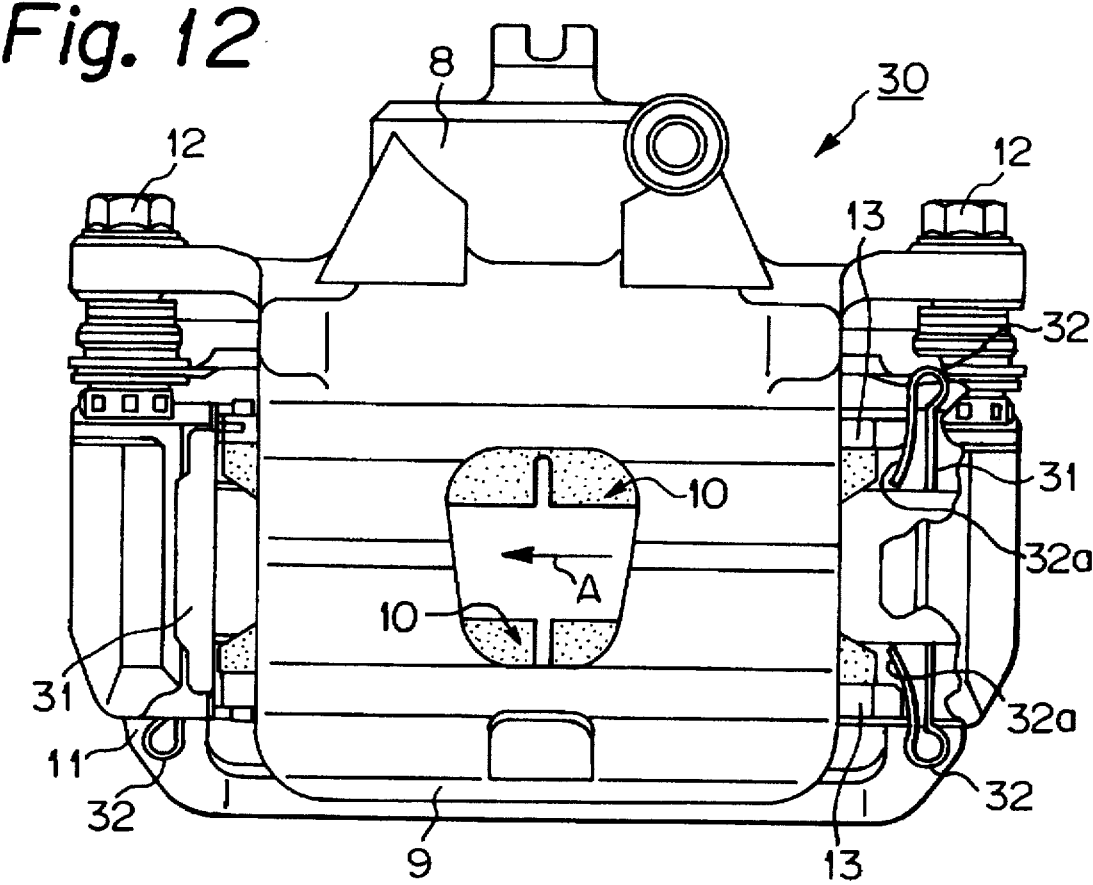
FIG. 12 is a plan view of a third embodiment of a disc brake according to the present invention.
Figure 13:
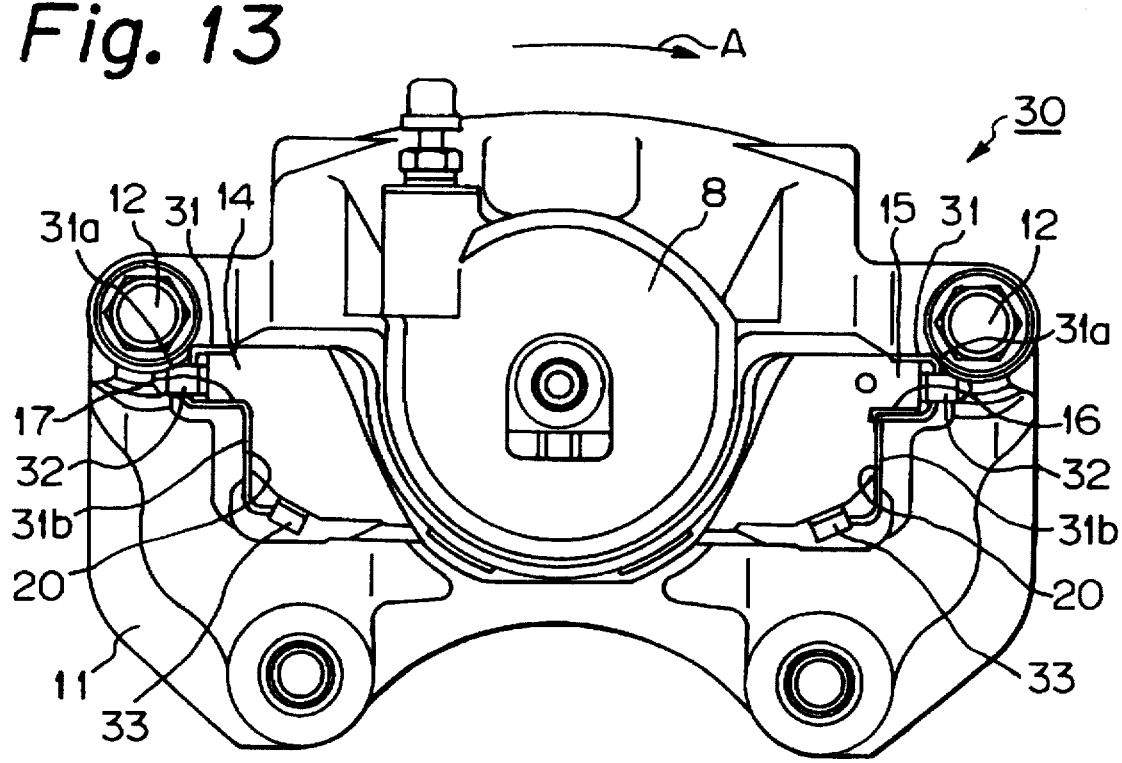
FIG. 13 is a front view of the disc brake shown in FIG. 12.

As shown in FIGS. 12 and 13, the disc brake 30 of the third embodiment includes a pad spring 31 provided at the front side of the disc brake 30 with respect to the rotational direction of the disc rotor 7 between the friction pads 10 and the carrier 11. The disc brake 30 also includes an opposite pad spring 31 provided at the rear side thereof between the friction pads 10 and the carrier 11. The pad springs 31 each comprises an upper portion extending over the disc rotor 7 and a pair of leg portions respectively extending downwardly from the opposite ends of the upper portion. In the pad spring 31 provided at the front side of the disc brake 30, the leg portions thereof each includes a guiding portion 31a for directing the convex portion 14 of the associated friction pad 10, a torque bearing portion 31b for undergoing braking torque from the associated back plate 13, and a retainer portion 31c having elasticity for bearing against the end portion of the associated back plate 13 at the inside of the disc rotor 7 (or the lower side portion of the associated back plate 13) to prevent the associated friction pad 10 from vibrating during a braking or engine working state. The front side pad spring 31 is fixedly mounted on the carrier 11. In the opposite pad spring 31 provided at the rear side of the disc brake 30, the leg portions thereof each includes a guiding portion 31a for directing the convex portion 15 of the associated friction pad 10, a torque bearing portion 31b for undergoing braking torque from the associated back plate 13, and a retainer portion 31c having elasticity for bearing against the end portion of the associated back plate 13 at the inside of the disc rotor 7 (or the lower side portion of the associated back plate 13) to prevent the associated friction pad 10 from vibrating during a braking or engine working state. The rear side pad spring 31 is also fixedly mounted on the carrier 11. With respect to the above construction of the pad springs, the first and third embodiments are generally the same.

Figure 14:
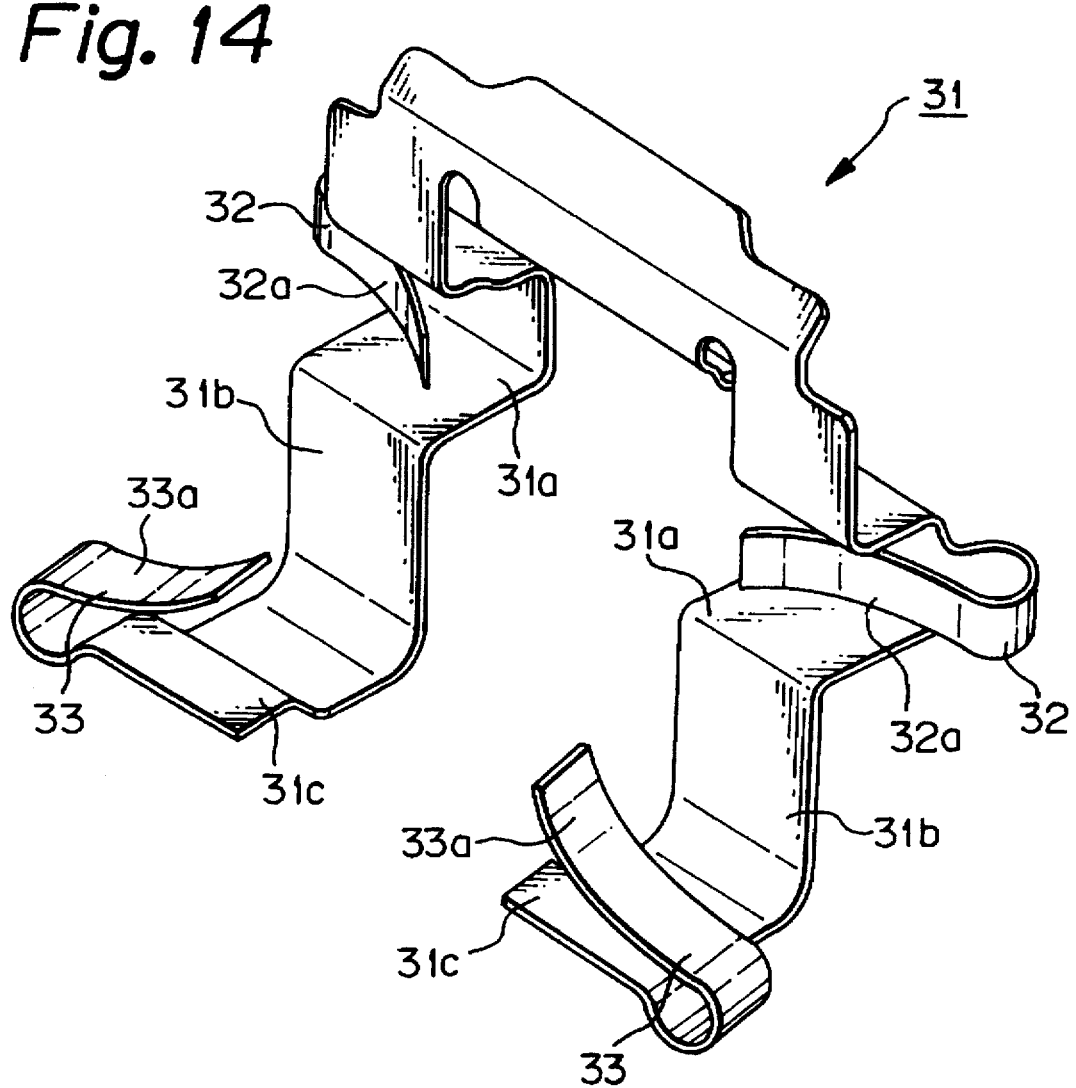
FIG. 14 is a perspective view of a pad spring provided in the disc brake shown in FIG. 12.
Figure 15:
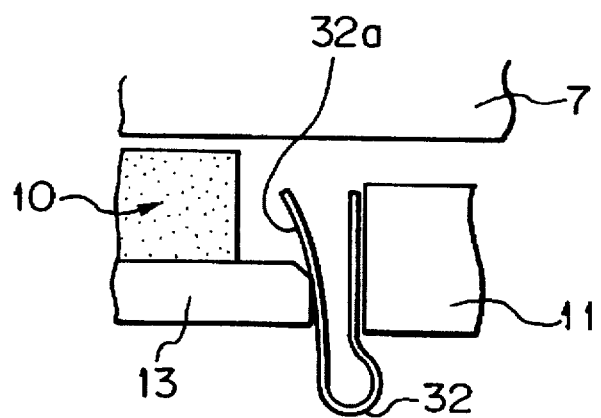
FIG. 15 is a view showing the abutting portion between an back plate of the friction pad and the first spring portion of a pad spring which are provided in a disc brake shown in FIG. 12.
Figure 16:
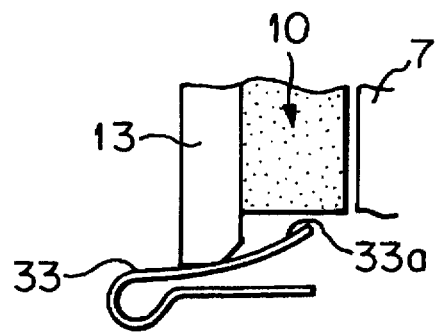
FIG. 16 is a view showing the abutting portion between the back plate of the friction pad and the second spring portion of the pad spring which are provided in the disc brake shown in FIG. 12.

As shown in FIG. 14, each of the front side pad spring 31 and the rear side pad spring 31 includes a pair of first spring portions 32 respectively extending from the guiding portions 31a thereof and a pair of second spring portions 33 respectively extending from the retainer portions 31c. The first spring portions 32 of the front side pad spring 31 further laterally obliquely extend from the guiding portions 31a and 31a, respectively and are bent to be generally shaped in a "U" form. The first spring portions 32 of the front side pad spring 31 include oblique surfaces 32a, respectively. The oblique surfaces 32a of the front side pad spring 31 are resiliently pressed against the end portions of the back plates 13 of the friction pads 10 at the inside of the disc rotor 7 (or the distal ends of the convex portions 14 and 14 of the back plates 13 of the friction pads 10) with a predetermined set load to bias the friction pads 10 away from the disc rotor 7, respectively. Similarly, the first spring portions 32 of the rear side pad spring 31 further laterally obliquely extend from the guiding portions 31a, respectively and are bent to be generally shaped in a "U" form. The first spring portions 32 of the rear side pad spring 31 include oblique surfaces 32a, respectively. The oblique surfaces 32a and 32a of the rear side pad spring 31 are also resiliently pressed against the end portion of the back plates 13 and 13 of the friction pads 10 at the inside of the disc rotor 7 (or the distal ends of the convex portions 15 of the back plates 13 of the friction pads 10) with a predetermined set load to bias the friction pads 10 away from the disc rotor 7, respectively. The oblique surfaces 32a each of the front side and rear side pad springs 31 are bent to extend toward the lateral sides of the friction pads 10, respectively (see FIG. 15).

The second spring portions 33 and 33 of the front side pad spring 31 include oblique surfaces 33a and 33a, respectively. The second spring portions 33 and 33 thereof upwardly obliquely extend from the retainer portions 31c and 31c, and are bent to be shaped like a letter "U", respectively. The oblique surfaces 33a and 33a of the front side pad spring 31 are resiliently pressed against the end portions of the back plates 13 and 13 of the friction pads 10 and 10 at the inside of the disc rotor 7 (or the lower side portions of the back plates 13 and 13 of the friction pads 10 and 10) with a predetermined set load to bias the friction pads 10 and 10 away from the disc rotor 7, respectively (see FIG. 16). Similarly, the second spring portions 32 and 32 of the rear side pad spring 31 include oblique surfaces 33a and 33a, respectively. The second spring portions 33 and 33 thereof upwardly obliquely extend from the retainer portions 31c and 31c, and are bent to be shaped like a letter "U", respectively. The oblique surfaces 33a and 33a of the rear side pad spring 31 are also resiliently pressed against the end portions of the back plates 13 and 13 of the friction pads 10 and 10 at the inside of the disc rotor 7 (or the lower side portions of the back plates 13 and 13 of the friction pads 10 and 10) with a predetermined set load to bias the friction pads 10 and 10 away from the disc rotor 7, respectively. The oblique surfaces 33a and 33a each of the front side and rear side pad springs 31 and 31 are bent to extend toward the lower sides of the friction pads 10 and 10, respectively (see FIG. 16). It should be noted that it is not necessary for the first spring portions 32 and 32 and the second spring portions 33 and 33 of the front side pad spring 31 and the first spring portions 32 and 32 and the second spring portions 33 and 33 of the rear side pad spring 31 to always bias the back plates 13 and 13 at any position of the back plates 13 and 13, respectively. A biasing force to be applied to the back plates 13 and 13 by the above first and second spring portions is sufficient to move the friction pads 10 and 10 from the braking position in which the friction pads 10 and 10 are pressed against the disc rotor 7 during braking to a release position away from the disc rotor 7 by a predetermined distance during a non-braking state.

In the above construction, as in the case of the first embodiment, when releasing the brakes, the piston of the hydraulic cylinder 8 is moved rearward, and the friction pads 10 and 10 are removed from engagement with the disc rotor 7. Then pressing of the first spring portions 32 and 32 and the second spring portions 33 and 33 of the front side pad spring 31 and the first spring portions 32 and 32 and the second spring portions 33 and 33 of the rear side pad spring 31 against the back plates 13 and 13 by the biasing force thereof causes the friction pads 10 and 10 to be moved rearward to be suitably spaced from the disc rotor 7. The front side and rear side pad springs 31 and 31 are fixedly mounted o the carrier 11. The first spring portions 32 and 32 and the second spring portions 33 and 33 are integrally formed with the front pad spring 31 and the rear pad spring 31. The first spring portions 32 and 32 and the second spring portions 33 and 33 of the front side pad spring 31 and the first spring portions 32 and 32 and the second spring portions 33 and 33 of the rear side pad spring 31 move the associated friction pads 10 and 10 by biasing force thereof. Thus, this enables the opposite friction pads 10 and 10 to be reliably moved away from the disc rotor 7.

Figure 17:
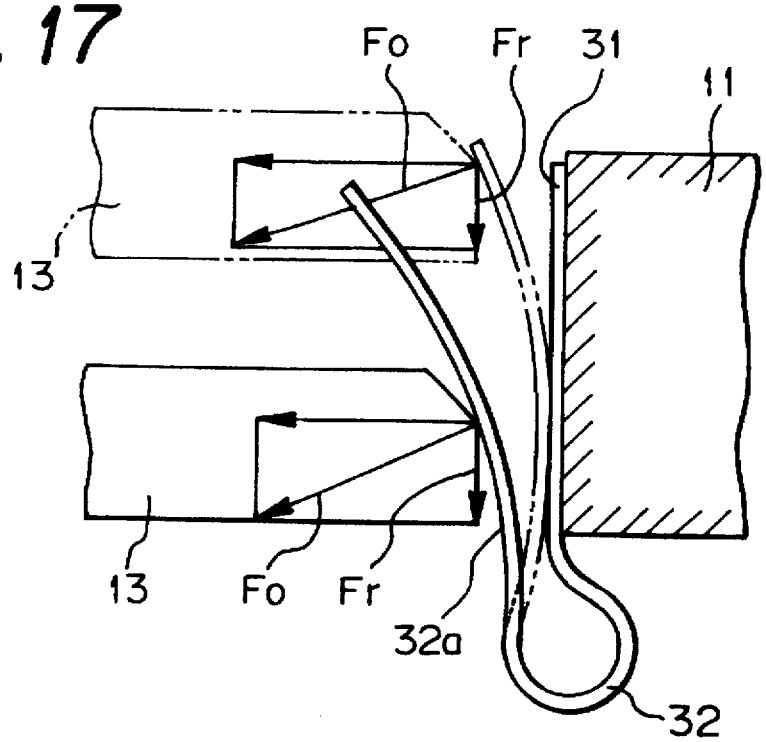
FIG. 17 is a view showing the abutting portion between the back plate of the friction pad and the first spring portion of the pad spring in the disc brake shown in FIG. 12, and showing the relation between the wear of the friction pad and the biasing force of the first spring portion.

FIG. 17 shows the relation between one of the first spring portions of the front side pad spring 31 and the associated back plate 13. As the friction pad 10 and 10 are worn away, the back plates 13 and 13 are moved toward the disc rotor. In other words, in FIG. 17, the back plate 13 is moved from the position (shown by the solid line) of the back plate 13 in a case where the friction pad is new to the position (shown by the phantom line) thereof in a case where the friction pad is worn away. When the back plate 13 is moved to the position shown by the phantom line, the position on the oblique surface 32a of the first spring portion 32 against which the back plate 13 abuts is moved toward the distal end of the oblique surface 32a. Since the oblique surface 32a of the first spring portion 32 is bent, movement of the abutting portion between the oblique surface 32a and the back plate 13 toward the distal end of the oblique surface 32a allows an amount of deflection of the oblique surface 32a to be increased. This does not decrease a biasing force $F_o$ in the first spring position 32 and a component $F_r$ of the biasing force acting in a direction to move the friction pad away from the disc rotor 7, thereby enabling the friction pads 10 and 10 to be reliably moved away from the disc rotor 7 and preventing drag from being generated in spite of an amount of wear of the friction pads. The other first spring portions and the second spring portions perform the same function as the above first spring portion shown in FIG. 17.

Figure 18:
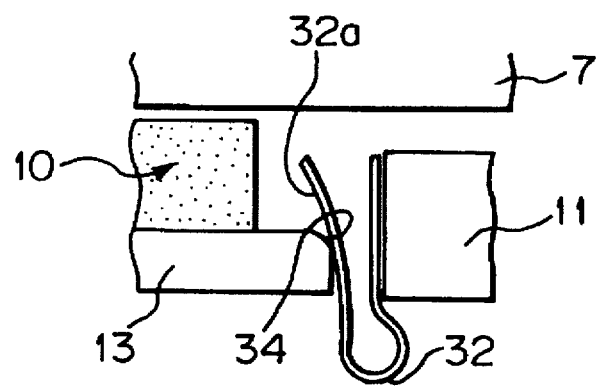
FIG. 18 is a view showing the abutting portion between the back plate of the friction pad and the first spring portion of the pad spring in a first modification of the third embodiment of the present invention.
Figure 19:
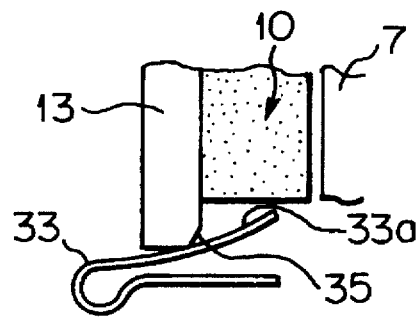
FIG. 19 is a view showing the abutting portion between the back plate of the friction pad and the second spring portion of the pad spring in a first modification of the third embodiment of the present invention.

A first modification of the third embodiment is shown in FIGS. 18 and 19. FIG. 18 is a top view generally showing an upper side portion of one back plate 13 in the front side thereof with respect to the rotational direction of the disc rotor. In FIG. 18, the back plate 13 includes an "R" (or curved) portion 34 at the portion thereof abutting against oblique surface 32a of the first spring portion 32. FIG. 19 is a side view generally showing a front and lower side portion of one back plate 13. In FIG. 19, the back plate 13 includes an "R" (or curved) portion 35 at the portion thereof abutting against the oblique surface 33a of the second spring portion 33. The provision of the "R" portions 34 and 35 on the abutting portions of the back plate 13 allows the front side abutting portions of the back plate 13 to be smoothly slide on the oblique surfaces 32a and 33a, respectively, thereby enabling the friction pads 10 and 10 to be reliably moved away from the disc rotor 7. In the first modification of the third embodiment, the rear side abutting portions of one back plate 13 and the rear and front side abutting portions of the other back plate 13 also respectively include "R" portion as shown in FIGS. 18 and 19.

Figure 20:
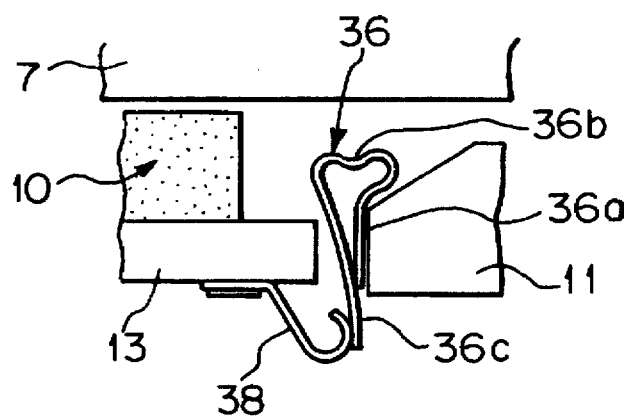
FIG. 20 is a view showing the abutting portion between the back plate of the friction pad and the first spring portion of the pad spring in a second modification of the third embodiment of the present invention.
Figure 21:
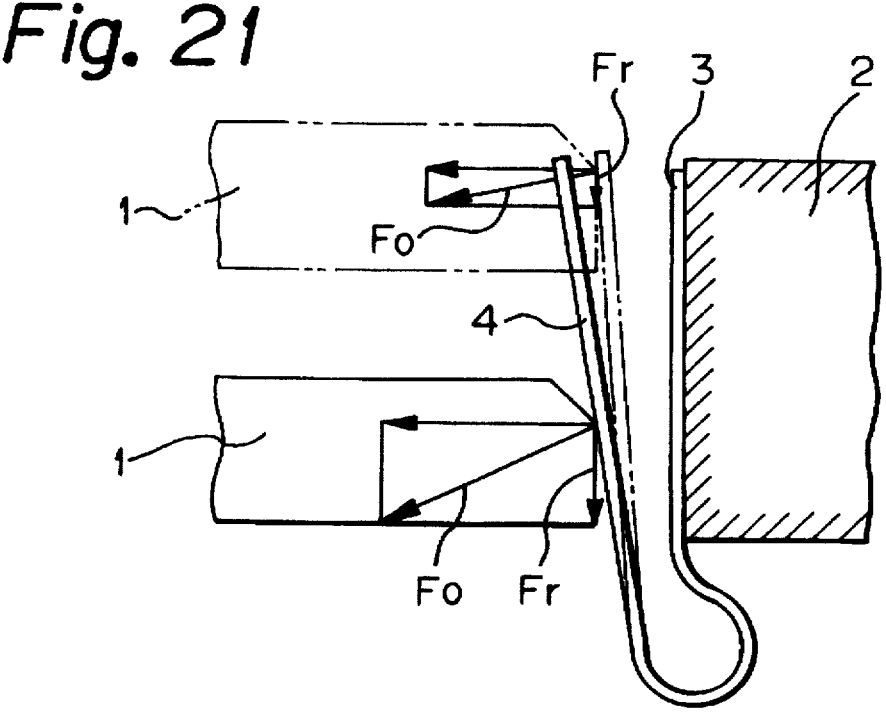
FIG. 21 is a view showing the relation between the wear of the friction pad and the biasing force of the leaf spring arm in a typical disc brake in which the friction pads are biased away from the disc rotor by the leaf spring arm.

A second modification of the third embodiment is shown in FIG. 20. FIG. 20 is a top view generally showing the front side portion of one friction pad 10 with respect to the rotational direction of the disc rotor. A front side pad spring according to the second modification is different from the front side pad spring 31 of the above third embodiment in that a pair of first spring portions 36 are provided in place of the first spring portions 32 of the front side pad spring 31 and a pair of loop-shaped auxiliary springs 38 are respectively attached to the back plates 13 and 13 as shown in FIG. 20. FIG. 20 shows only one first spring portion 36 and one auxiliary spring 38 of the front side pad spring according to the second modification of the third embodiment. The other first spring portion and the other auxiliary spring are not shown. A rear side pad spring according to the second modification thereof also includes a pair of first spring portions and a pair of loop-shaped auxiliary springs respectively attached to the back plates which are the same as those shown in FIG. 20. In the second modification of the third embodiment, since the rear side pad spring is identical to the front side pad spring, illustration of the rear side pad spring is omitted. The first spring 36 of the front side pad spring includes a proximal end portion 36a mounted on the carrier 11, a bent portion 36b provided in the disc rotor side of the first spring 36, and a distal end portion 36c extending in a direction away from the disc rotor 7. The bent portion 36b includes a plurality of loop portions to easily deflect the first spring portion 36. A loop-shaped auxiliary spring 38 is attached to the back plate 13 of the pad spring 10 to face the first spring 36. The first spring portion 36 and the auxiliary spring 38 are resiliently pressed against each other with a predetermined set load to bias the friction pad 10 in a direction away from the disc rotor 7. In the second modification of the third embodiment, the front side pad spring further include a pair of second spring portions (not shown) constructed as the first spring portions 36 (see FIG. 20) and a pair of loop-shaped auxiliary springs (not shown) constructed as the auxiliary spring 38 (see FIG. 20) in place of the second spring portions 33 and 33 (see FIG. 14), and the rear side pad spring is constructed in the same manner as the front side pad spring.

Next, the function of the second modification of the third embodiment will be explained with respect to one first spring portion 36 and one auxiliary spring 38 shown in FIG. 20. Since the other spring portions and the other auxiliary springs are identical to those shown in FIG. 20, respectively, the function thereof is omitted.

By employing the above construction, as in the case of the third embodiment, during a non-braking state, the friction pad 10 can be moved away from the disc rotor 7. When the abutting portion between the first spring portion 36 and the auxiliary spring 38 is moved by the friction pad 10 being worn away, the bent portion 36b cooperates with the auxiliary spring 38 to absorb change of a biasing force each of the first spring portion 36 and the auxiliary spring 38 which is caused by movement of the abutting portion. Thus, this enables the biasing force acting on the back plate 13 by the first spring portion 36 and the auxiliary spring 38 to be kept at a constant, and the friction pad 10 to be reliably moved away from the disc rotor 7, and drag to be prevented in spite of the degree of wear of the friction pad 10.

In the third embodiment and the first and second modifications of the third embodiment, means for moving the friction pads 10 and 10 rearward are provided in the front and rear sides of the disc rotor 7 with respect to the rotational direction of the disc rotor 7, respectively. It should be noted that means for moving the friction pads 10 and 10 rearward may be provided only the front side of the disc rotor 7, thereby sufficiently enabling the friction pads 10 and 10 to be reliably moved away from the disc rotor 7 and preventing drag from being generated.

According to the present invention, the biasing force of the biasing means acts on the friction pads in vicinity of the end portions of the back plates. Thus, this enables the friction pads to be smoothly moved rearward without being inclined and to be reliably moved away from the disc rotor. In addition, a constant biasing force is applied to each of the friction pads regardless of the position of the friction pads during a braking state. Thus, this enables the friction pads to be reliably moved away from the disc rotor and drag to be prevented in spite of an amount of wear of the friction pads.

According to the present invention, during a non-braking state, the biasing force of the spring element fixedly mounted on the carrier act on the back plates of the friction pads through the wear warning elements, respectively to move the friction pads away from the disc rotor, thereby preventing drag from being generated.

According to the present invention, during a non-braking state, the biasing force of the spring portions of the pad spring fixedly mounted on the carrier acts on the back plates of the friction pads, respectively to move the friction pads away from the disc rotor. As the friction pads are worn away, the abutting portions between the spring portions of the pad spring and the back plates are moved to the distal end portions of the spring portions, respectively. Since the spring portions are bent, the movement of the abutting portions allows an amount of deflection of the spring portions to be increased, thereby enabling the friction pads to be reliably moved away from the disc rotor and preventing drag in spite of an amount of wear of the friction pads.

According to the invention, during a non-braking state, the biasing force of the spring elements fixedly mounted on the carrier acts on the back plates of the friction pads through the auxiliary springs, respectively to move the friction pads away from the disc rotor. During the movement of the friction pads away from the disc rotor, the spring elements cooperate with the auxiliary springs, respectively. This enables the biasing force acting on the back plates to be kept at a constant, the friction pads to be reliably moved away from the disc rotor, and drag to be prevented in spite of the degree of wear of the friction pads.

Various other features and advantages of the invention are set forth in the following claims.

What is claimed is:

1. A disc brake assembly for applying a braking force to a disc rotor having a pair of brake surfaces, said disc brake assembly comprising:

a pair of friction pads positionable at opposite sides of the disc rotor for pressing against the brake surfaces of the disc rotor during a braking operation, each of said friction pads including a back plate having an end portion, wherein said end portion of one back plate of said pair of back plates faces said end portion of the other back plate of said pair of back plates;

a carrier for guiding said end portions of said back plates;

a pad spring mounted on said carrier for slidably supporting said friction pads relative to said carrier, said pad spring including a pair of integrally formed spring portions biasing said pair of friction pads, in the vicinity of said end portions of said back plates away from the disc rotor, wherein said spring portions continually bias said friction pads; and a pair of wear warning elements mounted on said back plates of said pair of friction pads, respectively, said pair of wear warning elements being disposed in the vicinity of said end portions of said back plates, such that, when a predetermined amount of at least one of said friction pads is worn away, at least one of said wear warning elements directly contacts the brake surface of the disc rotor to generate a warning noise, wherein said pair of spring portions of said pad spring engage said wear warning elements to bias said friction pads through said wear warning elements away from the disc rotor.

2. The disc brake as claimed in claim 1, wherein said pad spring is provided at a front side of the disc rotor with respect to a direction of rotation of the disc rotor.

3. The disc brake as claimed in claim 1, wherein said pad spring is provided at a rear side of said disc rotor with respect to a rotational direction of the disc rotor.

4. The disc brake as claimed in claim 1, wherein:

said pad spring is provided between said pair of friction pads and said carrier;

said pad spring includes an upper portion extending over the disc rotor and a pair of leg portions extending downwardly from said upper portion on opposite sides of the disc rotor;

each of said leg portions including a guide portion for guiding one of said end portions of said back plates, a torque bearing portion for undergoing braking torque from said one of said back plates, and an elastic retainer portion bearing against a lower side portion of one of said back plates; and said pair of integrally formed spring portions extend from said guiding portions, respectively.

5. The disc brake as claimed in claim 4, wherein said pad spring is integrally formed in one piece.

6. The disc brake as claimed in claim 5, wherein:

each of said pair of wear warning elements includes a first bent portion having a proximal end fixedly mounted on a back side of one of said back plates, a second bent portion defining an inner space, and a contact portion extending over said end portion of said one back plate toward the disc rotor;

each of said pair of spring portions of said pad spring includes a U-shaped proximal end portion extending from one of said guiding portions, and a distal end portion extending from said proximal end portion of said spring portion through said inner space defined by said second bent portion of one of said wear warning elements; and said distal end portions are resiliently pressed against said second bent portions of said pair of wear warning elements, respectively.

7. The disc brake as claimed in claim 5, wherein said pad spring includes a pair of stoppers for limiting movement of said pair of integrally formed spring portions away from the rotor disc, respectively.

8. A disc brake assembly for applying a braking force to a disc rotor having a pair of brake surfaces, said disc brake assembly comprising:

a first friction pad including a back plate having a first end portion;

a second friction pad including a back plate having a first end portion which faces said first end portion of said first friction pad back plate, wherein said first and second friction pads are positionable on opposite sides of the disc rotor so that said first and second friction pads are engagable with the pair of brake surfaces, respectively;

a carrier for guiding said first end portions of said first and second friction pad back plates;

a first pad spring fixedly mounted on said carrier so as to be positioned between said carrier and said first end portions of said first and second friction pad back plates for slidably supporting said first and second friction pads relative to said carrier;

a first wear warning element directly fixedly mounted on said first end portion of said first friction pad back plate so as to face one of the brake surfaces of the disc rotor;

a second wear warning element directly fixedly mounted on said first end portion of said second friction pad back plate so as to face the other of the brake surfaces of the disc rotor;

a first spring element provided at said first pad spring for engaging said first wear warning element in order to bias said first friction pad away from the disc rotor; and a second spring element provided at said first pad spring for engaging said second wear warning element in order to bias said second friction pad away from the disc rotor.

9. The disc brake as claimed in claim 8, wherein said first and second spring elements are integrally formed with said first pad spring.

* * * * *